United States Patent [19]

Tanner et al.

[11] Patent Number: 5,416,227

[45] Date of Patent: May 16, 1995

[54] DYE SALTS OF THE ANTHRAQUINONE DYE SERIES

[75] Inventors: Martin Tanner, Tentlingen; Dieter Mäusezahl, Biel-Benken; Paul Lienhard, Frenkendorf; Robert von Arx, Muttenz, all of Switzerland

[73] Assignee: Ciba-Geigy Corporation, Ardsley, N.Y.

[21] Appl. No.: 195,741

[22] Filed: Feb. 14, 1994

Related U.S. Application Data

[63] Continuation of Ser. No. 536, Jan. 4, 1993, abandoned, which is a continuation of Ser. No. 654,142, Feb. 11, 1991, abandoned.

[30] Foreign Application Priority Data

Feb. 27, 1990 [CH] Switzerland .................... 629/90

[51] Int. Cl.⁶ .................... C07C 50/18; C07C 50/20
[52] U.S. Cl. .................... 552/232; 552/228; 552/229; 552/230; 552/231; 106/23 D
[58] Field of Search ............... 552/228, 229, 230, 231, 552/232; 106/23 D

[56] References Cited

U.S. PATENT DOCUMENTS

| | | | |
|---|---|---|---|
| 3,320,287 | 5/1967 | Schwander | 552/231 |
| 3,842,102 | 10/1974 | Hindermann et al. | 552/229 |
| 3,859,283 | 1/1975 | Hindermann et al. | 552/229 |
| 3,994,872 | 11/1976 | Kuster | 260/147 |
| 4,005,066 | 1/1977 | Gottschalk et al. | 260/145 |
| 4,539,418 | 9/1985 | Takaga et al. | 556/451 |

FOREIGN PATENT DOCUMENTS 944409  12/1963  United Kingdom .

*Primary Examiner*—James H. Reamer
*Assistant Examiner*—Kimberly J. Kestler
*Attorney, Agent, or Firm*—George R. Dohmann; Michele A. Kovaleski

[57] ABSTRACT

The invention includes printing ink compositions containing an organic solution of a film-forming polymer and a dye salt of formula

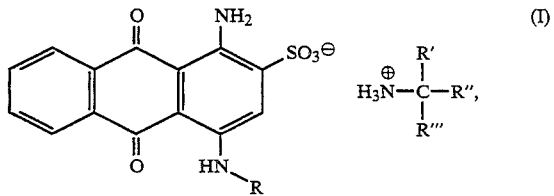

wherein R is a group of formula

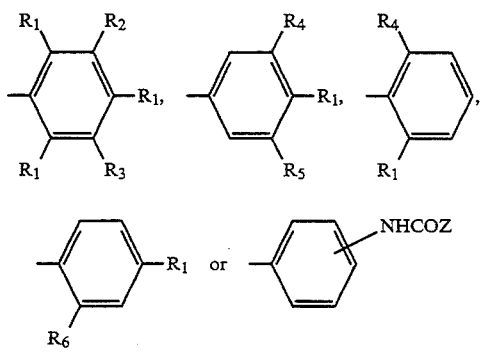

wherein $R_1$ is $C_{1-4}$alkyl, $R_2$ and $R_3$ are each independently of the other hydrogen, $CH_2X$, $SO_2Y$ or NHCOZ, $R_4$ is hydrogen or $C_1$-$C_4$alkyl and $R_5$ is $CH_2X$, $SO_2Y$ or NHCOZ, X is a $NHCOR_6$ or $NR_7SO_2R_6$ group, Y is $NR_8R_9$ or $N(R_8)_2$, and Z is $C_1$-$C_4$alkyl or $NHR_9$, $R_6$ is $C_1$-$C_4$alkyl, unsubstituted phenyl or phenyl which is substituted by $C_1$-$C_4$alkyl or halogen, $R_7$ is hydrogen or $C_1$-$C_4$alkyl and $R_8$ is hydrogen, $C_1$-$C_4$alkyl or a

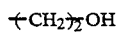

group, and $R_9$ is hydrogen $C_1$-$C_4$alkyl or phenyl, and R', R" and R''' are alkyl radicals containing together 10 to 24 carbon atoms, or a mixture of such dye salts.

These dye salts are suitable for colouring organic solutions of polymers and are distinguished by their good solubility in organic solvents as well as by their purity, high saturation, adhesion, storage stability, and fastness to light and weathering.

1 Claim, No Drawings

DYE SALTS OF THE ANTHRAQUINONE DYE SERIES

This is a continuation of application Ser. No. 08/000,536, filed on Jan. 4, 1993, abandoned, which is a continuation of application Ser. No. 07/654,142, filed Feb. 11, 1991, also abandoned.

The present invention relates to novel salts of sulfonated anthraquinone dyes and to the use thereof for colouring organic solutions of polymers.

In U.S. Pat. No. 3,994,872 there are disclosed, among numerous other dye salts, also those of 1-amino-4-phenylaminoanthraquinone-2-sulfonic acid, 1-amino-4-p-toluylaminoanthraquinone-2-sulfonic acid, 1-amino-4-(3,4-dimethylphenylamino)anthraquinone-2-sulfonic acid and 1-amino-4-cyclohexylaminoanthraquinone-2-sulfonic acid. These dye salts do not in all respects meet the requirements of current technology.

Novel salts of sulfonated anthraquinone dyes have now been found which are distinguished by surprisingly good properties such as purity, high saturation, optimum absorption band form, good adhesion and storage stability and good fastness to migration, light and weathering and good solubility in organic solvents.

Specifically, the invention relates to dye salts of formula

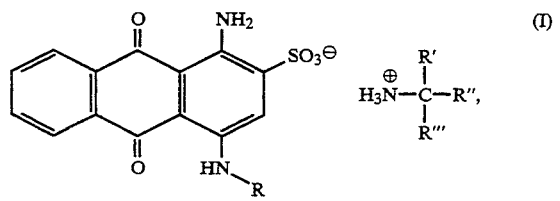

wherein R is a group of formula

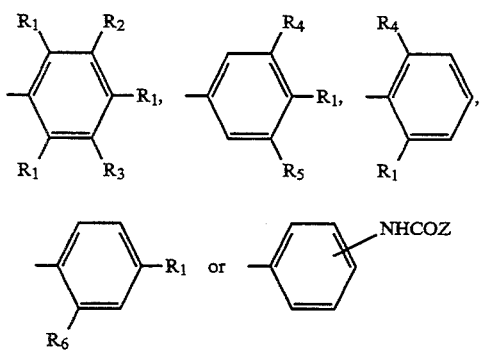

wherein $R_1$ is $C_1$-$C_4$alkyl, $R_2$ and $R_3$ are each independently of the other hydrogen, $CH_2X$, $SO_2Y$ or NHCOZ, $R_4$ is hydrogen or $C_1$-$C_4$alkyl and $R_5$ is $CH_2X$, $SO_2Y$ or NHCOZ, X is a $NHCOR_6$ or $NR_7SO_2R_6$ group, Y is $NR_8R_9$ or $N(R_8)_2$, and Z is $C_1$-$C_4$alkyl or $NHR_9$, $R_6$ is $C_1$-$C_4$alkyl, unsubstituted phenyl or phenyl which is substituted by $C_1$-$C_4$alkyl or halogen, $R_7$ is hydrogen or $C_1$-$C_4$alkyl and $R_8$ is hydrogen, $C_1$-$C_4$alkyl or a

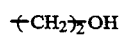

group, and $R_9$ is hydrogen $C_1$-$C_4$alkyl or phenyl, and R', R" and R''' are alkyl radicals containing together 10 to 24 carbon atoms, and mixtures of such dye salts.

Substituents defined as $C_1$-$C_4$alkyl may be methyl, ethyl, n-propyl, isopropyl, n-butyl, sec-butyl or tertobutyl.

Halogen is typically bromo, iodo or, preferably, chloro.

Particularly interesting dye salts of formula I are those, wherein R is a group of formula

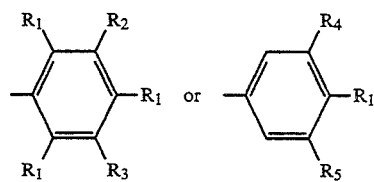

wherein $R_1$, $R_2$, $R_3$, $R_4$ and $R_5$ are as defined above, especially those wherein $R_1$ is methyl or ethyl and, more especially, those wherein $R_1$ is methyl, $R_2$ and $R_3$ are each independently of the other hydrogen or $CH_2X$, $R_4$ is methyl and $R_5$ is $SO_2Y$, X is a $NHCOR_6$ group and Y is $NHR_8$, and $R_6$, $R_7$ and $R_8$ are as defined above.

Preferred dye salts of formula I are those wherein R is a group of formula

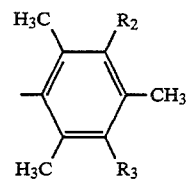

wherein $R_2$ and $R_3$ are each independently of the other hydrogen or a $CH_2$—$NHCOC_6H_5$ group, and those of formula I, wherein R is a group of formula

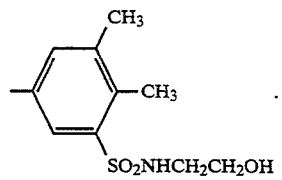

The dye salts of this invention can be prepared by methods which are known per se, for example by reacting an aminoanthraquinonesulfonic acid of formula

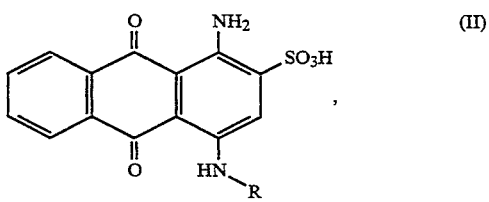

wherein R is as defined above, with an amine of formula

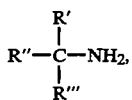

(III)

wherein R', R" and R'" are as defined above.

Particularly suitable amines for the preparation of the dye salts of this invention are the products available from Rohm and Haas Co. under the registered trademarks ®PRIMENE 81-R and ®PRIMENE JM-T. These products are mixtures of amines of formula

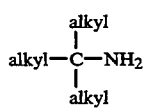

PRIMENE 81-R containing a total of 12 to 14, and PRIMENE JM-T a total of 18 to 22, carbon atoms.

The aminoanthraquinonesulfonic acids of formula II are known products. Those that may be new can be prepared by methods analogous to per se known ones.

The salt formation is carded out by commonly known methods, conveniently by reacting a solution or suspension of an alkali metal salt of the dyestuff sulfonic acid with an aqueous solution of the water-soluble salt of the amine, preferably one with a lower carboxylic acid, in particular of formic or acetic acid. The reaction is carded out with advantage in the temperature range from 40° to 80° C. and at a pH below 7.

As the dye salts are insoluble in the reaction medium, they can be isolated by filtration.

The reaction can also be carded out in organic solvents alone or in solvent-water mixtures. A preferred embodiment of the process comprises adding to an aqueous solution or suspension of an alkali metal salt of the dyestuff sulfonic acid a solution of the amine in an only sparingly water-soluble organic solvent, acidifying the mixture with an inorganic or organic acid and thoroughly mixing it. The amine salt of the dyestuff sulfonic acid transfers to the organic phase and, after phase separation, can be isolated by evaporating the solvent. The reaction in the two-phase system is carded out in the temperature range from 10° C. to the boiling point of the solvent-water mixture. The preferred organic solvents used are chlorinated hydrocarbons such as methylene chloride, chloroform or chlorobenzene, ethers such as diisopropyl ether or dioctyl ether, ketones such as methyl isobutyl ketone or diisopropyl ketone, esters such as ethyl acetate, butyl acetate or tert-butyl propionate, or also alcohols such as n-butanol, iso- or tert-amyl alcohol.

Owing to the successful combination of a few specific parameters, it has been possible to develop a process which permits the preparation of surprisingly useful products of excellent quality.

Accordingly, the invention also relates to a process for the preparation of dye salts of formula I

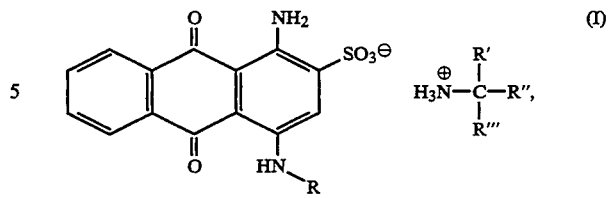

wherein R, R', R" and R'" are as defined above, which comprises reacting the alkali metal salt of an aminoanthraquinonesulfonic acid of formula

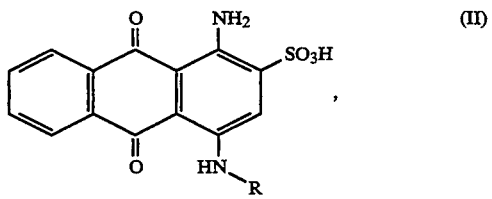

wherein R is as defined above, with the 1 to 1.1-fold molar amount of an amine salt of formula

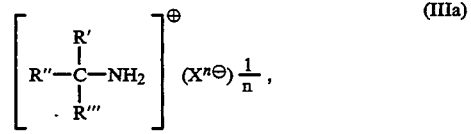

wherein R', R" and R'" are as defined above, X is the anion of a mineral acid, and n is 1 to 3, in a lower alkanol, preferably at room temperature and in the pH range from 3 to 5, and isolating the reaction product by conventional methods.

By mineral acid is meant typically sulfuric acid, phosphoric acid or, preferably, hydrochloric acid.

A lower alkanol is typically ethanol, propanol, isopropanol, n-butanol, n-pentanol and, preferably, methanol.

Compared with the known prior art processes, the process of this invention has a number of significant advantages:
— shorter reaction time and more complete reaction;
— fewer problems when isolating the product;
— more uniform quality.

Compared with two-phase processes (water/only sparingly water-soluble solvent), as disclosed, for example, in U.S. Pat. No. 4,539,418,
— the separation of the aqueous phase is dispensed with;
— fewer problems with noxious odours;
— the tendency to clumping during the drying procedure is insignificant.

Compared with pure solvent processes as described, for example, in U.S. Pat. No. 4,005,066 and in GB patent 944 409
— the process is carried out at room temperature;
— no large excess of amine is necessary;
— fewer problems with noxious odours;

The novel dye salts have excellent solubility, especially in lower alkanols such as methanol, ethanol, n-propanol or isopropanol, in alkylene glycol monoalkyl ethers such as ethylene glycol monomethyl or monoethyl ether, in alkylene glycols such as propylene glycols, or in aliphatic alcohols such as benzyl alcohol, or in mixtures of such alcohols, as well as in lower aliphatic ketones such as acetone, methyl ethyl ketone, methyl isobutyl ketone or also in cyclohexanone, in carboxylates such as methyl acetate, ethyl acetate, butyl acetate or glycol monoacetate, and in halogenated hydrocarbons such as chloroform, methylene chloride, ethylene chloride or carbon tetrachloride, and also in mixtures of such solvents with water.

The solutions of the dye salts of this invention have good storage stability i.e. they have only a slight tendency to flocculate or to form deposits during prolonged storage.

Owing to their good solubility in the above mentioned ketones, especially acetone, the dye salts obtainable by the process of this invention are suitable for colouring cellulose acetate in the spinning dope. And owing to their good solubility in halogenated lower aliphatic hydrocarbons, especially chloroform and methylene chloride/methanol 9:1, they can also be used for the dope dyeing of cellulose triacetate. The dope-dyed fabric is distinguished by the purity and intensity of the shade, by uniform distribution of the colourant and by very good fastness properties, for example fastness to washing, water, bleaching, cross-dyeing, dry cleaning, rubbing, ironing, dry heat and light.

Their good solubility in alcohols, esters and mixtures thereof makes the novel dye salts particularly suitable for colouring film-forming polymers.

Alcoholic and/or ester-containing solutions of film-forming polymers will be understood in this context as meaning those liquid vehicles which are suitable for use in printing inks for flexographic printing. They are also very suitable for use in ink-jet printing inks. The polymers present in these solutions are typically natural resins such as shellac or manila copal, or cellulose derivatives, for example cellulose ethers such as ethyl cellulose or cellulose esters such as nitrocellulose, and maleate resins or phenyl/formaldehyde resins which are preferably modified with rosin, for example the products disclosed in U.S. Pat. No. 2,347,923, polyamide resins, i.e. polycondensates of polyamines with polycarboxy compounds, which are disclosed in U.S. Pat. No. 2,663649, formaldehyde/urea condensates and formaldehyde/melamine condensates, ketone/formaldehyde condensates, polyvinyl acetates or polyacrylic resins, for example polybutyl acrylate resin or mixtures thereof, and also polycondensates of polyhydric alcohols, such as glycerol or pentaerythritol, with polybasic acids, such as maleic acid or phthalic acid, alone or in combination with unsaturated fatty acids such as linseed oil or castor oil.

In addition, the solutions of film-forming polymers may contain the conventional auxiliaries used in the coating industry, for example wetting agents such as higher fatty acid bis(hydroxyalkyl)amides, typically bis($\beta$-hydroxyethyl)cocoamide, plasticisers such as phthalic acid, and further ingredients such as silicone oil.

These solutions of film-forming polymers which contain dye salts of this invention are suitable for printing a variety of materials, for example metal sheets such as aluminium sheets, paper, glass, synthetic resin sheets and films and the like. The solutions of film-forming polymers are also suitable for coating a wide variety of surfaces such as metal pans, plastic mouldings or wooden boards. They are storage stable and give level, intense, water-resistant coatings which have good adhesion and are fast to overspraying, heat, light and weathering.

The dye salts of this invention are also suitable for preparing printing inks for ink-jet printers. Owing to their good solubility and their low content of inorganic salts, the inks obtained have excellent allround fastness properties such as excellent stability during storage and in printing. The prints have good definition and water-resistance.

If necessary, the printing ink can be adapted by conventional techniques to the ink-jet system in order to obtain optimum values with respect to, for example, viscosity, surface tension and specific conductivity.

The invention is illustrated by the following Examples in which percentages are by weight, unless otherwise stated.

Example 1: A moist filter cake containing 28 g of the dye of formula

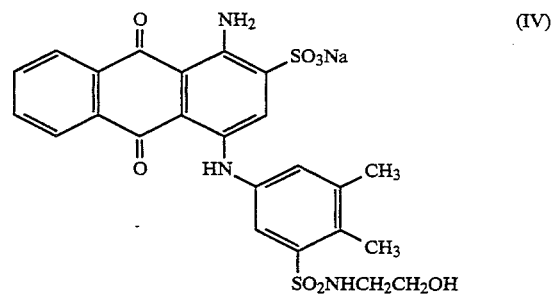

is suspended in 300 ml of methyl isobutyl ketone. A solution of 12.5 ml of ®PRIMENE 81-R amine (ex Rohm and Haas) and 3 ml of formic acid in 300 ml of water is added over half an hour. The reaction mixture is then stirred for 5 hours at room temperature before phase separation. The organic phase is extracted 3 times with 250 ml of water and then evaporated to dryness under reduced pressure, giving 32 g of the desired blue dye salt.

|          |        | C     | H    | N    |
|----------|--------|-------|------|------|
| Analysis: | cal.:  | 59.5% | 6.8% | 7.6% |
|          | found: | 58.7% | 7.1% | 7.0% |

Example 2: The procedure of Example 1 is repeated, replacing the dye (IV) with 35 g of a dye of formula

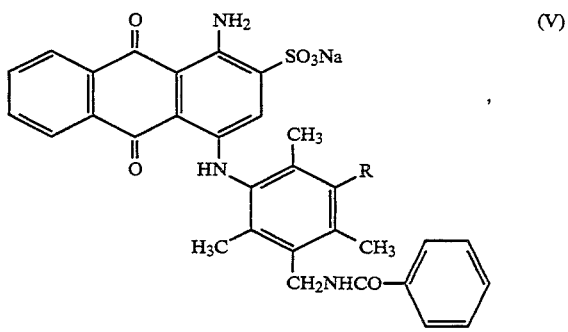

wherein R = ½ H and

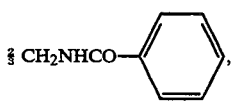

to give 39 g of a blue dye salt which qualitatively has the same properties as the product obtained in Example 1.

|           |       | C     | H    | N    |
|-----------|-------|-------|------|------|
| Analysis: | cal.: | 68.8% | 7.1% | 7.8% |
|           | found:| 68.2% | 7.3% | 7.4% |

Example 3: 45.8 g of a dry dye of formula

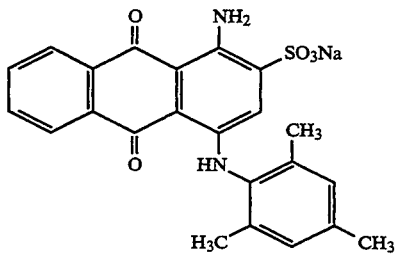

are suspended in 900 ml of water and the suspension is heated to 70° C. Then 350 ml of methyl isobutyl ketone and 27.4 ml of ®PRIMENE 81-R amine are added. After 30 minutes, ca. 11 ml of 32% HCl are added dropwise until the pH of the aqueous phase has fallen to 4±0.5. After a further 30 minutes the phases are separated. The organic phase is extracted once more with 100 ml of water for 30 minutes at 70° C. After repeated phase separation the organic phase is evaporated to dryness under reduced pressure and the blue product is dried at 120° C. in a vacuum drier, giving 56 g of a blue dye salt.

|           |       | C     | H    | N    |
|-----------|-------|-------|------|------|
| Analysis: | cal.: | 67.8% | 7.7% | 6.7% |
|           | found:| 67.4% | 7.6% | 6.6% |

Example 4: 35 g of the dye of formula V (as in Example 2) are suspended in 800 ml of water and the suspension is heated to 90° C., stirred for 2 hours and thereafter cooled to 50° C. A solution of 12.5 ml ®PRIMENE 81-R amine and 3 ml of formic acid in 150 ml of water are then added dropwise. The reaction mixture is subsequently stirred for 2 hours and filtered at 50° C. The residue is washed with cold water and dried, giving 43 g of a blue dye salt which qualitatively has the same properties as those of the product obtained in Example 2.

|           |       | C     | H    | N    |
|-----------|-------|-------|------|------|
| Analysis: | cal.: | 68.8% | 7.1% | 7.8% |
|           | found:| 67.0% | 6.8% | 7.6% |

Example 5: 30 g of the dye of formula V, wherein R=4/5 H and 1/5

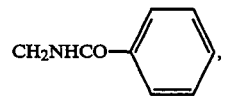

are suspended in 250 ml of water and the suspension is heated to 70° C. After half an hour, a solution of 14 ml of ®PRIMENE 81-R amine in 200 ml of methyl isobutyl ketone is added. After a further half hour, ca. 6 ml of concentrated hydrochloric acid are added dropwise until the pH of the aqueous phase is 4-4.5. The reaction mixture is stirred for 1 hour and then cooled to room temperature and the phases are separated. The organic phase is washed once with 200 ml of water at 70° C. (ca. 30 minutes), freed from water and evaporated to dryness under reduced pressure, giving 42 g of a blue dye salt.

|           |       | C     | H    | N    |
|-----------|-------|-------|------|------|
| Analysis: | cal.: | 68.6% | 7.2% | 7.4% |
|           | found:| 68.5% | 7.5% | 7.0% |

Examples 6–18: Further dye salts are obtained by repeating the procedure of Example 3, using dyes of formula

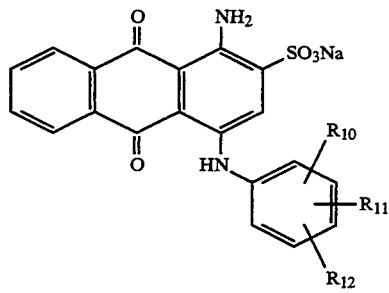

wherein $R_{10}$, $R_{11}$ and $R_{12}$ have the meanings given in the following Table:

| Examples | $R_{10}$ | $R_{11}$ | $R_{12}$ | Product analysis % |  |  |
|---|---|---|---|---|---|---|
|  |  |  |  | C | N | S |
| 6 | 3-NHCOCH$_3$ | H | H | 64.4 | 7.6 | 4.8 |
| 7 | 3-NHCOCH$_2$CH$_3$ | H | H | 64.6 | 8.3 | 4.9 |
| 8 | 4-NHCOCH$_3$ | H | H | 64.0 | 8.6 | 5.0 |
| 9 | 4-N(CH$_3$)COCH$_3$ | H | H | 64.3 | 8.2 | 5.0 |
| 10 | 3-NHCOCH$_3$ | 4-CH$_3$ | H | 64.4 | 8.2 | 4.8 |
| 11 | 3-SO$_2$NHCH$_2$CH$_2$OH | 4-CH$_3$ | H | 58.7 | 7.5 | 8.7 |
| 12 | 3-SO$_2$NHCH$_2$CH$_3$ | 4-CH$_3$ | 5-CH$_3$ | 60.3 | 7.4 | 8.8 |
| 13 | 3-SO$_2$N(CH$_2$CH$_3$)$_2$ | 4-CH$_3$ | 5-CH$_3$ | 61.0 | 7.2 | 8.6 |
| 14 | 3-SO$_2$N(CH$_3$)$_2$ | 4-CH$_3$ | 5-CH$_3$ | 60.4 | 7.5 | 8.9 |
| 15 | 3-SO$_2$N(CH$_3$)CH$_2$CH$_2$OH | 4-CH$_3$ | 5-CH$_3$ | 59.2 | 7.4 | 8.4 |
| 16 | 2-CH$_3$ | 4-CH$_3$ | H | 66.9 | 6.4 | 5.1 |
| 17 | 2-CH$_3$ | 6-CH$_3$ | H | 65.0 | 6.6 | 5.5 |

-continued

| Examples | $R_{10}$ | $R_{11}$ | $R_{12}$ | Product analysis % | | |
|---|---|---|---|---|---|---|
| | | | | C | N | S |
| 18 | 2-$CH_2CH_3$ | 6-$CH_3$ | H | 65.2 | 6.3 | 5.4 |

Example 19: The procedure of Example 3 is repeated, replacing 27.4 ml of ®PRIMENE 81 -R amine with 44.9 ml of ®PRIMENE JM-T, to give a product of comparably good properties.

Example 20: A 1 liter flask with ground glass stopper is charged with 600 ml of methanol and then 256 g (0.558 mol) of the dye of formula VI (as in Example 3) and 117 g (0.614 mol) of ®PRIMENE 81-R amine are added in succession. The reaction mixture is adjusted to pH 5.0 with ca. 72 g (0.62 mol) of 32% hydrochloric acid and stirred for ca. 15 minutes. With efficient stirring, the resultant clear solution is charged over ca. 30 minutes to 2000 ml of cold water, whereupon the product precipitates in readily filterable form. The precipitate is isolated by filtration and the filter cake is washed and dried to constant weight. Yield: 336 g (97% of theory).

Example 21: 5 g of the dye salt obtained in Example 1 are added to 95 g of a nitrocellulose coating composition prepared from 15 g of alcohol-soluble, low viscosity nitrocellulose containing ca. 18% of dibutyl phthalate, 10 g of ethylene glycol monoethyl ether, 20 g of ethyl acetate and 50 g of 94% ethanol. The mixture is stirred until the colourant is homogenised. The coating composition is then applied with a film applicator (hand-coater supplied by RK Chemical Co. Ltd., Royston, GB) to a wet film thickness of ca. 12 μm on opalin paper or an aluminium backing sheet and dried, to give a firmly adhesive, level, intense blue finish which has excellent resistance to light exposure as well as to treatment with water and butter.

Example 22: A two-layer finish is provided on aluminium sheeting in the following steps:

a) Binder: 67.5 g of a non-drying alkyd resin in the form of a 60% solution in xylene (®ALKYDAL F 27, Bayer), 26.4 g of a partially esterified melamine/formaldehyde precondensate as 55.% solution in a 1:1 mixture of butanol/xylene (®MAPRENAL TTX, Cassella), 1.1 g of xylene, 4 g of ethylene glycol monoethyl ether and 1 g of a 1% solution of a silicone oil in xylene are homogenised.

b) Layer 1: 5 g of a commercially available finely particulate aluminium powder are suspended in 10 g of methyl ethyl ketone and 10 g of butyl acetate. Then 75 g of the binder described in a) are incorporated in this suspension. The resultant dispersion is adjusted to the viscosity required for application with a solvent mixture comprising 60% of xylene, 20% of butanol and 20% of ethylene glycol monoethyl ether, and applied to an aluminium sheet. The solvents are evaporated by drying for 30 minutes at 80° C.

c) Layer 2:1 g of the dye salt prepared according to Example 1 is dissolved in 99 g of the binder described in a) and the solution is adjusted with the solvent mixture of b) to sprayable viscosity. The solution is applied with a spray gun as second layer to the pretreated aluminium sheet. The coloured coat is finished by drying for 30 minutes and stoving at 130° C. An intense blue finish of good fastness to weathering and light is obtained.

Example 23: 20 g of the dye salt obtainable according to Example 1, 30 g of bleached wax-free shellac, 5 g of dibutyl phthalate and 45 g of ethanol are mixed. The resultant printing ink has good storage stability and can be used as obtained or diluted with ethanol for flexographic printing on paper and aluminium sheets. The printing ink gives brilliant and intense blue prints of good adhesion on these materials.

Example 24: 10 g of the dye salt obtainable according to Example 2 is stirred into 90 g of a solution comprising 25% of an alcohol-soluble, ester-modified polyamide resin (prepared, for example, according to Example 7 of U.S. Pat. No. 2,663,649), 2% of water, 5% of a petroleum fraction with a boiling range of 80°-100° C., 48% of ethanol and 20% of isopropanol. When printed by flexographic printing on cellophane, the printing ink so obtained gives a blue shade of good adhesion and excellent purity.

Example 25: 1.3 g of the dye salt obtained in Example 1 is strewed into 1000 g of a solution of acetyl cellulose in acetone having a solids content of 26%. Then 20 ml of acetone are added and the mixture is rolled in a well-stoppered bottle on a roller bed until the dye is completely dissolved. The coloured spinning solution is then forced through nozzles. The filament subsequently passes through a long heated pipe and can then be spooled immediately. The coloured material has a pure blue shade and has excellent fastness properties, especially excellent fastness to washing, water, bleaching, cross-dyeing, dry cleaning, rubbing, ironing, dry heat and light.

Example 26: 6 g of the dye salt obtained according to Example 20 and 1 g of ketone resin ®SPRITHARZ SK (Hüls) are mixed with 80 g of methyl ethyl ketone, 8 g of isopropyl acetate and 5 g of ethoxypropanol. The mixture is dissolved by efficient stirring and then filtered through a 0.2 μm sieve. The printing ink so obtained is admirably suitable for use in conventional ink-jet printing methods.

What is claimed is:

1. A printing ink composition comprising
   A) an organic solution of a film-forming polymer or mixture thereof; and
   B) a dye salt of the formula (I)

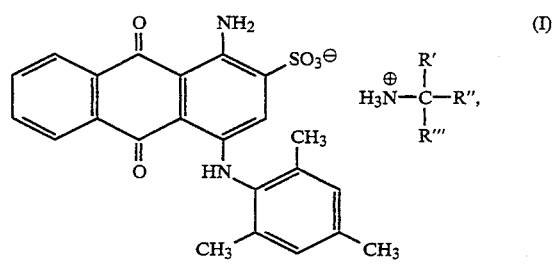

wherein R', R" and R'" are alkyl radicals together containing between 10 and 24 carbon atoms.

* * * * *